United States Patent [19]

Eidelberg

[11] 4,151,046
[45] Apr. 24, 1979

[54] DOUBLE EFFECT FLOATING SOLAR STILL COMPRISING A SUBMERGED CONDENSING SYSTEM

[76] Inventor: Joseph Eidelberg, 8 Clafford Lane, Melville, N.Y. 11746

[21] Appl. No.: 890,785

[22] Filed: Mar. 27, 1978

[51] Int. Cl.² .............................................. C02B 1/06
[52] U.S. Cl. .................................. 202/180; 202/234; 159/1 SF; 203/10; 203/25; 203/86; 203/100; 203/DIG. 1
[58] Field of Search ...................... 203/DIG. 1, 10, 25, 203/DIG. 17, 100, 86; 202/234, 180; 159/1 SF; 126/271

[56] References Cited

U.S. PATENT DOCUMENTS

| 3,015,613 | 1/1962 | Edmondson | 202/234 |
| 3,159,554 | 12/1964 | Mount | 202/234 |
| 3,279,527 | 10/1966 | Hardy | 202/234 |
| 3,357,898 | 12/1967 | Novakovich | 159/1 SF |
| 3,501,381 | 3/1970 | Delano | 202/234 |
| 3,785,931 | 1/1974 | Coffey et al. | 203/DIG. 1 |

Primary Examiner—Wilbur L. Bascomb, Jr.

[57] ABSTRACT

The double effect floating solar still uses a partly immersed corrugated metal plate to heat the upper layer of a body of water in order to establish a temperature difference between the upper and lower sections of the still. The difference in temperature creates a difference in vapor pressures, forcing the vapor produced in the hot section of the still to flow into a submerged condenser, giving up the heat of condensation to the surrounding water, preheating it before it reaches the stage of evaporation.

2 Claims, 1 Drawing Figure

DOUBLE EFFECT FLOATING SOLAR STILL COMPRISING A SUBMERGED CONDENSING SYSTEM

BACKGROUND OF THE INVENTION

Most solar stills, and particularly those of the greenhouse type, are of a low thermal efficiency because of a loss of heat. In such systems, the vapor produced in the still is condensed on the surface of glass panels, giving up the heat of condensation to the atmosphere, causing thereby a loss of energy. The purpose of the present invention is to improve the thermal efficiency of solar stills by using the heat of condensation for preheating the distilland before evaporating it.

SUMMARY OF THE INVENTION

In the double effect floating solar still a corrugated metal plate is used as a heat absorbing element. The corrugated plate, covered by glass, is immersed in the distilland in such a manner as to enable the non-immersed part of the corrugations to be used as ducts to carry the hot vapors into the cold submerged condenser.

When heated by solar radiation, the partly immersed corrugated metal plate brings about a rise in temperature in the upper section of the still, resulting in a higher vapor pressure. The higher pressure in the upper section of the still forces the vapor to flow into the submerged condenser, giving up the heat of condensation to the surrounding water, preheating it before it reaches the stage of evaporation.

DESCRIPTION OF THE PREFERRED EMBODIMENT

Figure 1:
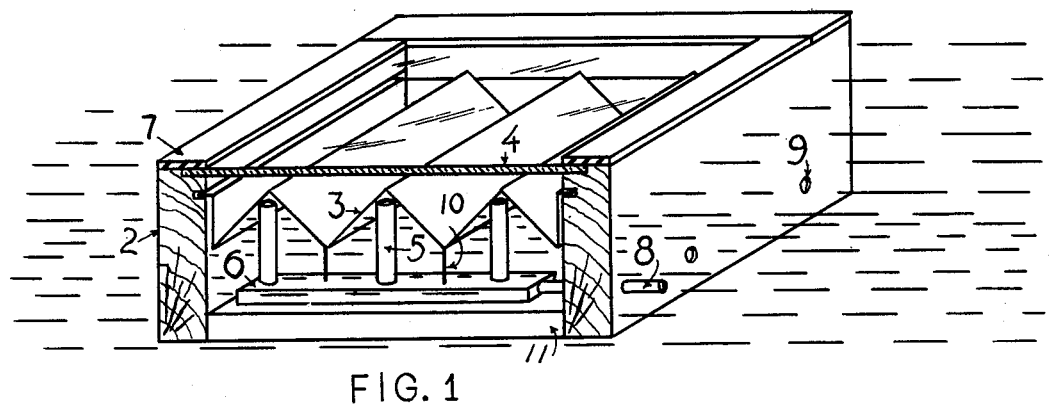
FIG. 1 is a perspective view of a typical cross section of the still, seen floating in a large body of water such as a sea, a lagoon, a lake or a pond.

In the system shown in FIG. 1, a floating frame 2 has its top covered by a transparent glass 4, and its bottom closed by an insulating material such as plastic foam or wooden planks 11.

The transparent glass 4 is held in place by rubber flaps 7 which are either glued or nailed to the floating frame 2. Beneath the transparent glass, attached to the floating frame 2, is a corrugated metal plate 3 which covers the whole of the inner surface of the floating frame. The corrugated plate 3 has spacers 10 attached to it and adjusted so as to hold the submerged condenser 6 at a suitable distance from the bottom planks 11, to enable water to freely flow under the condenser.

The corrugated plate is preferably made of sheet metal the external surface of which is treated with a suitable black paint in order to enhance the absorption of heat. When heated by solar radiation, the black-painted corrugated metal plate transmits the heat to the water which is in contact with the underside of the corrugations, establishing a temperature difference between the condenser and the upper layer of water in the still.

The difference in temperature between the condenser and the upper layer of water in the still corresponds, as those who are skilled in the art know, to difference in vapor pressures. Therefore, as soon as the temperature of the water which is in contact with the underside of the corrugated plate 3 rises above the temperature of the submerged condenser 6, a difference in pressure is established in the system, forcing the vapor of the hot section to flow through the vertical pipes 5 into the submerged condenser 6, giving up the heat of condensation to the water which surrounds the condenser. Being lighter than the colder water which surrounds the floating still, the water preheated by the submerged condenser 6 has a natural tendency to reach the upper level of the still and to come in contact with the corrugated heat absorbing metal plate 3. There, the water is evaporated, allowing new cold water to enter into the confine of the still through inlets 9, provided at the sides of the still, near the bottom, and to maintain a continuous cycle of preheating the distilland, evaporating it and condensing the vapor to be taken out as fresh potable water from outlet 8 which is connected to a reservoir on the shore.

It is understood that minor variations from the form of the invention disclosed herein may be made without departure from the spirit and scope of the invention. The corrugations of the metal heat absorbing plate, for example, may have a different form from that shown in the drawing, and instead of transparent glass, a suitable transparent plastic plate may be used to cover the top of the double effect floating still. It is therefore quite obvious that the drawing and specifications of the disclosure are to be considered as merely illustrative rather than limiting in any way.

Having thus disclosed my invention, I claim:

1. A double effect floating solar distillation apparatus for the recovery of potable water from brackish or sea water, comprising a floating frame having its top covered by transparent glass, its bottom closed by wooden boards and is sides having water inlets close to the bottom, to admit sea or brackish water into the inner confine of the said floating frame, to be preheated, prior to its evaporation, by a submerged condenser which is situated in the inner confine of said floating frame, between the wooden bottom of the said frame and a corrugated heat absorbing metal plate which is supported in the inner confine of said floating frame in such manner that one part of the said corrugated heat absorbing metal plate is immersed in the distilland, while the other part, consisting of the ridges of the said corrugated heat absorbing metal plate, remains above the surface of the distilland, leaving free space under the ridges to be used as ducts to enable the vapor produced under the ridges to flow through conduits which are connected to the condenser in such manner that their tops protrude into the underside of the ridges of the corrugated heat absorbing metal plate, enabling the vapor to flow into a submerged condenser to be condensed into potable water which can be taken out of the condenser through suitable outlets.

2. A double effect floating solar distillation apparatus as defined in claim 1 wherein the outer surface of the corrugated heat absorbing metal plate is painted with a black paint to enhance the absorption of solar radiation.

* * * * *